(12) United States Patent
Lazarev

(10) Patent No.: US 10,445,633 B2
(45) Date of Patent: Oct. 15, 2019

(54) CONTACTLESS SMART CARD

(71) Applicant: JOINT-STOCK COMPANY "PAY RING", Moscow (RU)

(72) Inventor: Sergey Mikhailovich Lazarev, Tomsk (RU)

(73) Assignee: Joint-Stock Company "Pay Ring", Moscow (RU)

( * ) Notice: Subject to any disclaimer, the term of this patent is extended or adjusted under 35 U.S.C. 154(b) by 0 days.

(21) Appl. No.: 16/340,935

(22) PCT Filed: Oct. 12, 2017

(86) PCT No.: PCT/RU2017/000757
§ 371 (c)(1),
(2) Date: Apr. 10, 2019

(87) PCT Pub. No.: WO2018/070903
PCT Pub. Date: Apr. 19, 2018

(65) Prior Publication Data
US 2019/0286962 A1    Sep. 19, 2019

(30) Foreign Application Priority Data

Oct. 13, 2016    (RU) .................................. 2016140209

(51) Int. Cl.
*G06K 19/077* (2006.01)
*H01Q 1/38* (2006.01)
(52) U.S. Cl.
CPC .. *G06K 19/07722* (2013.01); *G06K 19/07745* (2013.01); *H01Q 1/38* (2013.01)
(58) Field of Classification Search
None
See application file for complete search history.

(56) References Cited

U.S. PATENT DOCUMENTS 9,288,836 B1 *   3/2016  Clement ............... H04W 84/18
10,139,859 B2 *  11/2018 von Badinski ......... G01P 15/00
(Continued)

FOREIGN PATENT DOCUMENTS

WO   WO-2015128188 A2 *   9/2015   ....... G06K 19/07747
WO   WO-2018020055 A1 *   2/2018   .............. H04W 4/80

*Primary Examiner* — Kristy A Haupt
(74) *Attorney, Agent, or Firm* — Preston Smirman; Smirman IP Law, PLLC

(57) ABSTRACT

The invention relates to designs of contactless smart cards. The subject matter of the invention is a device comprising a microchip arranged on a substrate, a loop antenna, the pins of which are connected to pins of the microchip, and also a capacitor connected in parallel with the loop antenna and therewith forming an antenna of the device in the form of a resonant circuit, the substrate being in the form of a band wound into a ring and made of a flexible dielectric material, on the outer surface of which a strip of electrically conductive material is applied, forming the loop antenna, which together with the microchip is coated with a protective coating, forming a sealed casing. The end of the internal coil of the substrate is equipped with a projecting piece which is folded in the direction of the external coil of the substrate, and a strip of electrically conductive material applied thereto is electrically connected to the strip of electrically conductive material applied to the end of the external coil of the substrate, wherein widened sections of electrically conductive material arranged on both sides of the strip of electrically conductive material below the projecting piece at the end of the internal coil of the substrate act as capacitor plates. The invention achieves the desired technical result of raising operating reliability.

1 Claim, 4 Drawing Sheets

(56) References Cited

U.S. PATENT DOCUMENTS

| | | | |
|---|---|---|---|
| 2002/0190125 A1* | 12/2002 | Stockhammer | G06K 9/00013 |
| | | | 235/382 |
| 2010/0052859 A1* | 3/2010 | Lossau | G06K 19/07749 |
| | | | 340/10.1 |
| 2016/0300211 A1* | 10/2016 | Brown | G06Q 20/3227 |
| 2016/0350581 A1* | 12/2016 | Manuel | G06K 9/00087 |
| 2017/0147138 A1* | 5/2017 | Dow | G06F 3/0227 |

\* cited by examiner

CONTACTLESS SMART CARD

CROSS-REFERENCE TO RELATED APPLICATION

The instant application is a national phase of PCT International Application No. PCT/RU2017/000757 filed Oct. 12, 2017, and claims priority to Russian Patent Application Serial No. 2016140209 filed Oct. 13, 2016, the entire specifications of both of which are expressly incorporated herein by reference.

This invention relates to design components, used in wiring circuits on digital data carriers for example, used for transferring data, in particular it relates to designs of contactless smart cards.

Contactless smart cards are equipped with an antenna built into the card and an electronic module: a microcircuit chip connected with the antenna. Smart cards enable data exchange by the means of contactless electromagnetic interaction between the card and the reading device, passing digital signals between the antenna of the card and the antenna of the reading device.

Contactless smart cards are often used as means of payment for accessing the transport network; they also can be used as personnel identification means.

There is a contactless card or a combined contact/contactless chip-card [RU 22511742, C2, G06K19/077, 10.05.2005], which includes an antenna installed on a substrate, and the said antenna contains at least one coil, formed on the substrate with electrically conductive paint using a screen printing method, and two parts of the body of the card on each side of the substrate, each of which includes at least one layer of plastic, and a microchip or a module, connected with the antenna, and the substrate is made of paper with a notch on each corner, and the two parts of the body of the card are soldered together at the level of the notches, and the card has the capacity of delaminating on bending in the bending stress application area, which makes it possible to later on detect a deliberately done damage to the card because the card keeps traces of bending.

The drawback of this model is its relatively low resistance to external effects.

The technologically nearest to this invention is the contactless smart card [RU 92558, U1, G06K19/077, 10.03.2010] that includes a substrate with an antenna consisting of several coils, and two layers of the card, one on each side of the substrate, and also a microchip or a module connected with the antenna, while the antenna also contains an electrically conductive joint, which loops some of the coils of the antenna, and the electrically conductive joint is located in the detachable section of the smart card.

The drawback of the technologically nearest design is its relatively low resistance to external because that device is relatively poorly protected from hazardous effects, and this determines its relatively low service reliability.

In particular, the card is not protected from mechanical impacts in the course of service because that card must be periodically taken out of its storage place and brought into contact with the reading device, then returned back to its storage place, which exposes the antenna and microchip to mechanical stresses.

Moreover, that model does not ensures protection from moisture and aggressive atmosphere, which reduces its protection level.

The present invention aims at producing a device of higher resistance and service reliability under mechanical stresses and in aggressive atmosphere, as well as resistance to external electric and magnetic fields.

The technological result of this invention consists in ensuring greater service reliability of the device.

This problem is solved and the required technological result is achieved by introducing—in accordance with the invention—into the device containing a microchip, located on the substrate, and a frame antenna, the leads of which are connected with those of the microchip, a capacitor, electrically placed in parallel with the frame antenna and, together with the said antenna, constituting the antenna of the device in the form of a resonance circuit, while the substrate presents a tape of an elastic dielectric material rolled up like a ring, the outer surface of which carries a strip of an electrically conductive material, which is covered—together with the microchip—with a protective coating that forms a hermetically sealed body, and the end of the inner coil of the substrate carries a projection folded towards the outer coil of the substrate, and the electrically conductive strip on its outer surface is electrically connected with the electrically conductive strip deposited on the end of the outer coil of the substrate, and the broadened areas of the electrically conductive material, formed on both sides of the electrically conductive strip under the projection at the end of the inner coil of the substrate, act as disks of the capacitor.

The structure of the contactless smart-card is shown in the drawing:

FIG. 1 Presents the general view of the contactless smart card;

Figure 1:
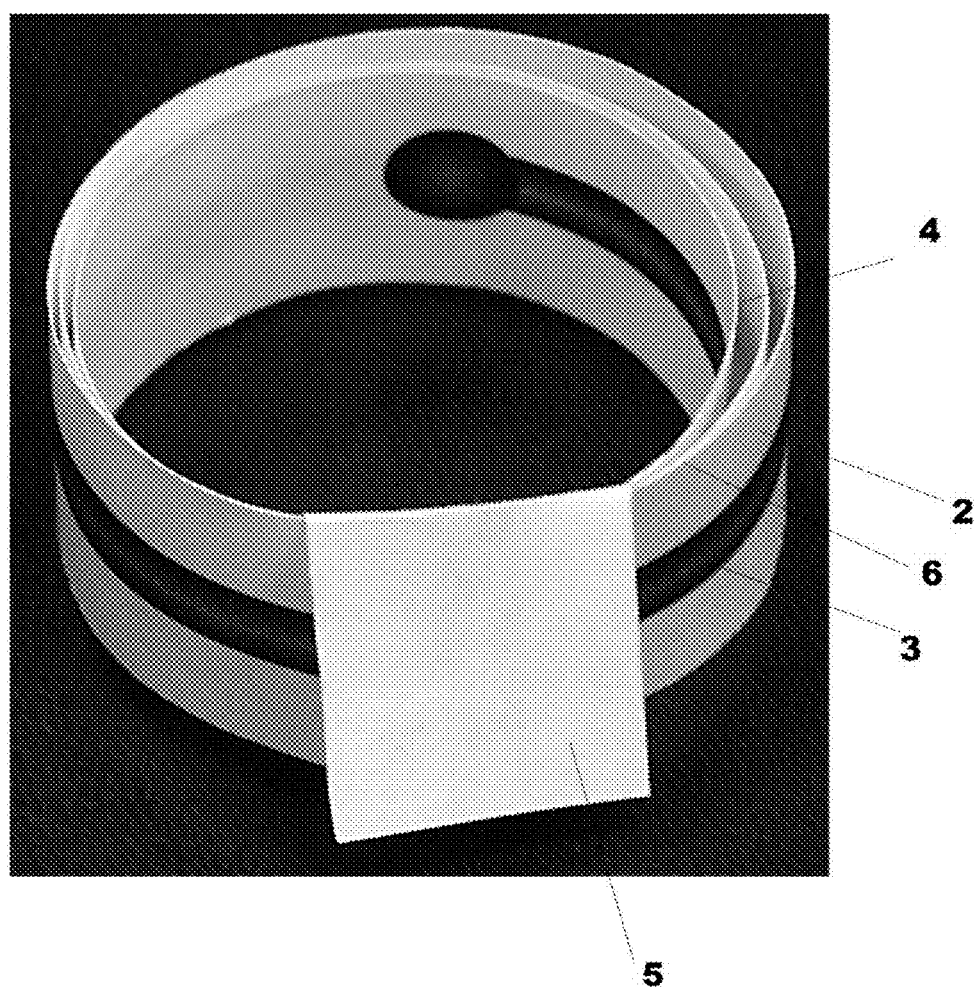
Figure 2:
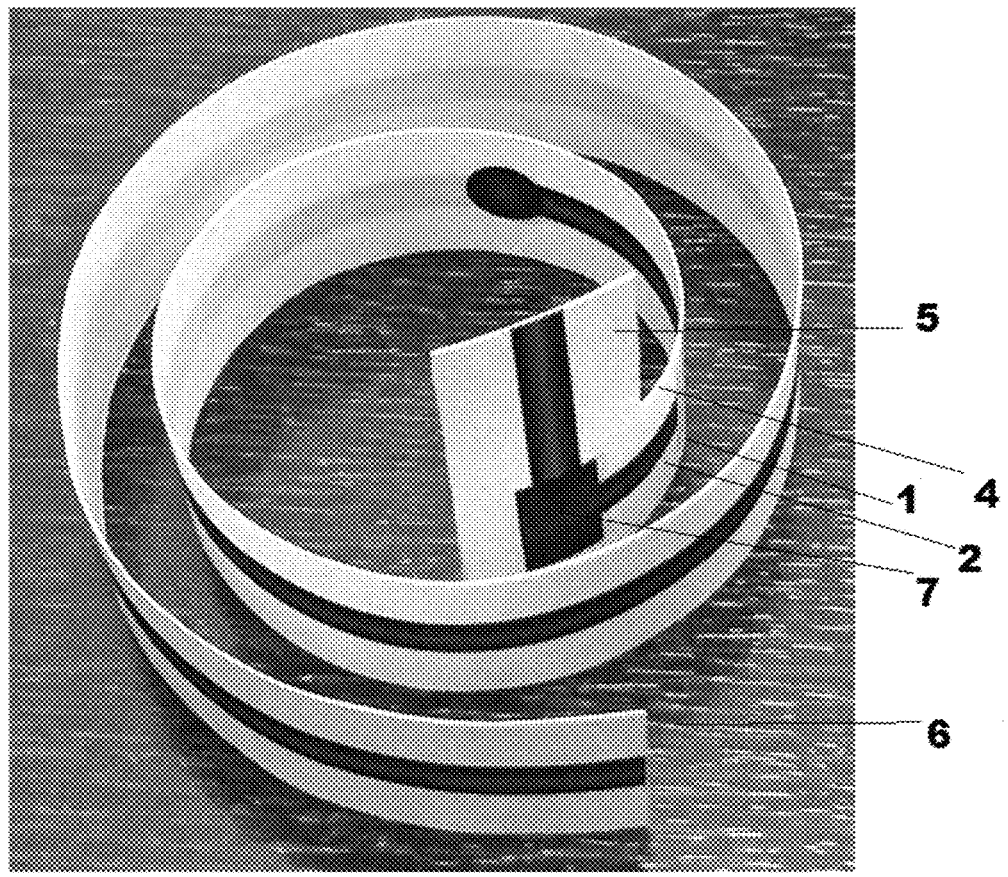
FIG. 2 Illustrates the manufacturing process of the invented smart card.
Figure 3:
FIG. 3 Shows the unwrapped tape of the elastic dielectric material.
Figure 4:
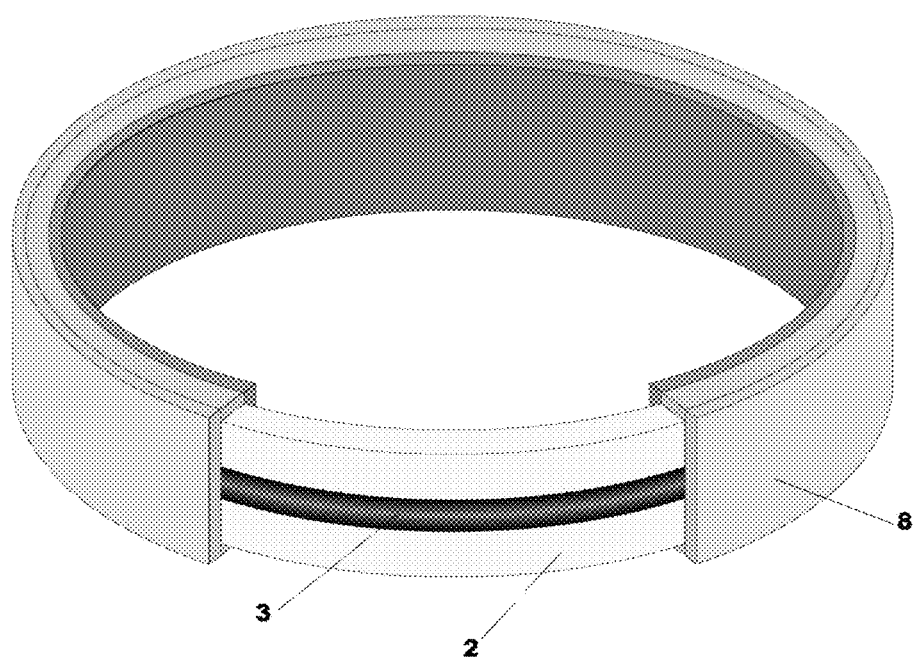

FIG. 4. Presents an example of the hermetically sealed case.

The proposed contactless smart card includes the microchip 1, installed on the substrate 2, and the frame antenna 3, the leads of which are connected with the leads of the microchip 1. The substrate 2 presents a tape of an elastic dielectric material, rolled up in the form of a ring, the outer surface of which carries a deposited strip of an electrically-conductive material that forms the frame antenna 3.

In this smart card model, the end of the inner coil 4 of the substrate has a projection folded towards the outer coil 6 of the substrate, and the electrically conductive strip deposited on its surface is electrically connected with the electrically conductive strip deposited on the end of the outer coil 6 of the substrate.

The invented smart card also contains a capacitor electrically placed in parallel with the frame antenna in the form of coils of an electrically conductive material on the substrate 2, forming—together with the said frame antenna—the antenna of the device in the form of a resonance circuit, while the disks 7 of the capacitor are formed by the broadened areas of the electrically conductive material on both sides of the strip of the electrically conductive material under the projection formed at the end of the inner coil 4 of the substrate.

The substrate 2, presenting a band of elastic dielectric material rolled up like a ring, with a strip of electrically conductive material deposited on its outer surface that forms the frame antenna 3, is coated, together with the microchip 1, with the protective coating 8, forming a hermetically sealed body.

The substrate 2, presenting a 2-4 mm wide rolled up tape of an elastic dielectric material, polyethylene terephthalate (PET) for example, on the outer surface of which a 0.5-3 mm wide strip of an electrically conductive material (aluminium, copper, silver etc.) is electrochemically deposited. The thickness of the substrate 2, including the electrically conductive strip, measures 0.01-0.1 mm. The length of the substrate 2 depends on the microchip 1 used and on the diameter of the finished product, and it can vary from 10 to 70 cm. The diameter of the finished product corresponds to the size of a dress-ring for example, 10-25 mm. The number of coils depends on the parameters of the finished product and the microchip 1 used. It can vary from 2 to 9. The substrate 2 may have a depression up to 3 mm deep and up to 6 mm wide to accommodate the microchip. After the microchip 1 has been installed, the depression can be sealed with a dielectric material, a polymer for example. Parameters of the resonance circuit depend on the microchip used and can be estimated accordingly.

The contactless smart card has the following structure.

The contactless smart card, which incorporates a built-in NFC chip, is most often formed like a ring. The diameter of the ring may correspond to the diameter of a piece of jewelry worn around a finger or a bracelet worn around the wrist. The protective coating 8, which can be made out of plastic, ceramic, a composite material etc., makes up the body of the device, which can be hermetically sealed, ensuring protection from moisture, dust and other negative effects. The body of the device can be used as a piece of jewelry in the form of a ring worn around a finger, ensuring reliable, hermetically sealed storage of electronic components of the device.

Microchip 1 provides interaction with the reading device, transferring coded data with radio signals. The frame antenna and the capacitor form a resonance circuit, which forms the antenna of the device: the contactless smart card.

Consequently, the new invention achieves the required technological result: improvement of service reliability of the device.

In particular, protection from mechanical impacts in the course of service has been introduced because the microchip is placed inside a reliable body, which practically excludes mechanical effects. The hermetically sealed body protects the device from moisture and aggressive atmosphere. Protection of the device from external electric and magnetic fields has been improved significantly, its sensitivity has been improved, and the transmission band of working frequencies of the antenna has been broadened.

The device can be firmly attached to its owner's body, without having to use additional accessories, and wearing this device does not require the owner's continuous attention, which expands application area (it could be used on the beach for example) and decreases the risk of losing the device.

The special features of this device are its small size in comparison with the known smart cards, its level of protection from aggressive atmosphere and option of having it firmly attached to the owner's body.

The invention claimed is:

1. A contactless smart card, comprising:
    a microchip formed on a substrate;
    a frame antenna, leads of which are connected with leads of the microchip; and
    a capacitor placed in parallel with the frame antenna and forming with the latter an antenna of the contactless smart card in the form of a resonance circuit;
    wherein the substrate has a shape of a ring, an outer surface of which carries an electrically conductive strip that forms the frame antenna, which, together with the microchip, is coated with a protective coating that forms a hermetically sealed body, and an end of an inner coil of the substrate carries a projection folded towards an outer coil of the substrate;
    wherein the electrically conductive strip deposited on its surface is electrically connected with the electrically conductive strip deposited on an end of the outer coil of the substrate;
    wherein expanded areas of the electrically conductive material on both sides of the electrically conductive strip under the projection at the end of the inner coil of the substrate act as disks of the capacitor.

* * * * *